United States Patent [19]

Steele et al.

[11] Patent Number: 4,495,620
[45] Date of Patent: Jan. 22, 1985

[54] TRANSMITTING DATA ON THE PHASE OF SPEECH

[75] Inventors: Raymond Steele, Hazlet; Wai C. Wong, Aberdeen, both of N.J.; Costas S. Xydeas, Loughborough, England

[73] Assignee: AT&T Bell Laboratories, Murray Hill, N.J.

[21] Appl. No.: 405,507

[22] Filed: Aug. 5, 1982

[51] Int. Cl.³ .......................... H04J 15/00; H04L 5/00
[52] U.S. Cl. .................................... 370/118; 375/122; 381/31
[58] Field of Search ...................... 370/118, 110.1, 76, 370/69.1; 375/122; 381/31, 29

[56] References Cited

U.S. PATENT DOCUMENTS

| | | | |
|---|---|---|---|
| 3,304,372 | 2/1967 | Filipowsky et al. | 179/2 |
| 3,681,530 | 8/1972 | Manley et al. | 179/1 |
| 3,809,817 | 5/1974 | Gill et al. | 370/20 |
| 4,053,713 | 10/1977 | Nitadori | 370/20 |
| 4,076,960 | 2/1978 | Buss et al. | 179/1 |

OTHER PUBLICATIONS

Proceedings of the 9th Convention of Electronical and Electronics Engineers in Israel; "Speech Compressed by means of the Discrete Fourier Transform"; Apr. 22–24, 1979; J. Shulman; p. A. 2–4.
IEEE Transactions on Communications," 1.544 Mbit/s Data Above FDM Voice Microwave Transmission"; Nov. 1975; K. Feher et al.; pp. 1321–1327.
IEEE Transactions on Communications; "Simultaneous Transmission of Digital Phase-Shift Keying and of Analog Television Signals"; K. Feher et al.; Dec. 1975; pp. 1509–1514.
IEEE Proceedings, vol. 127, pt. F, No. 2; "Channel Vocoder Based on C.C.D. Discrete-Fourier-Transform Processors"; Apr. 1980; M. C. Davie; pp. 132–143.

*Primary Examiner*—Douglas W. Olms
*Assistant Examiner*—Frank M. Scutch, III
*Attorney, Agent, or Firm*—Erwin W. Pfeifle; Wendy W. Koba

[57] ABSTRACT

The present invention relates to a means for achieving simultaneous transmission of data and speech with only a minimal expansion of the bandwidth of the speech signal. A Fourier transform (14) is performed on the speech signal and a predetermined number of phase components are replaced with data (d(n)) in an appropriate form. The number of phase components replaced with data is determined by approximately classifying the speech (16) as either "silence", no data inserted; "unvoiced" speech, M phase components convey data; and "voiced" speech, J phase components convey data; where J is less than M, and M is not greater than the number of phase components in the message band of the speech signal. An inverse Fourier transform (22) is subsequently performed on the combined data and speech signal. The combined message signal (G(t)) will comprise approximately the same bandwidth as the original speech signal, by virtue of the frequency domain insertion of the data into the speech. At the receiver the signal is inspected and a classifier (38) determines if data is embedded in the received signal. If data is deemed embedded, a Fourier transformation is performed, the data carrying phase components are inspected, and the data signal regenerated in an appropriate form. The phase components used for the conveyance of data are replaced by random phase components, and the inverse Fourier transformation performed. Median filtering is employed to mitigate the effects of end-of-block distortion and yield the recovered speech signal.

11 Claims, 3 Drawing Figures

TRANSMITTING DATA ON THE PHASE OF SPEECH

BACKGROUND OF THE INVENTION

1. Field of the Invention

The present invention relates to a means for transmitting data on the phase of speech and, more particularly, a means for embedding data into speech signals, with only a minimal increase in the signal bandwidth, by performing a discrete Fourier transform (DFT) on blocks of speech samples and replacing the resulting phase components of selected portions of the speech transform with the data which is desired to be transmitted.

2. Description of the Prior Art

There exist numerous systems which attempt to multiplex digital data with an analog signal. One early technique for voice-data multiplexing, diclosed in U.S. Pat. No. 3,304,372 issued to R. F. J. Filipowsky et al on Feb. 14, 1967, relates to a voice-data multiplexing system for transmitting data during the pauses in the voice signal. As taught in Filipowsky et al, voice signals are normally gated onto a transmission channel at the transmitter, but whenever gaps exceeding a minimum interval are sensed in the voice signals, a data source is activated and data transmission begins with the dispatch of a keying signal over the transmission channel.

There also exist methods of incorporating digital data with microwave analog signals, variously termed data-above-voice (DAV), data-under-voice (DUV) and data-above-video (DAVID). The former two systems are described in the article "1.544 Mbit/s Data Above FDM Voice and Data Under FDM Voice Microwave Transmission" by K. Feher et al in *IEEE Transactions on Communications*, November 1975, at pp. 1321-1327, while the latter method is described in the article "Simultaneous Transmission of Digital Phase-Shift Keying and of Analog Television Signals" by K. Feher et al in *IEEE Transactions on Communications*, December 1975, at pp. 1509-1514. As described in both articles, the data is transmitted in the unused portion of the spectrum, either below or above that portion dedicated to the microwave voice or video signal.

Methods also exist for utilizing Fourier transform techniques in association with speech signals prior to transmission. U.S. Pat. No. 3,681,530 issued to H. J. Manley et al on Aug. 1, 1972 relates to a bandwidth compression system wherein the discrete Fourier transform of the logged spectrum magnitudes of a speech signal are obtained to form the Fourier transform of the logarithm of the frequency spectrum magnitude (FTLSM) of the input speech. An encoding unit selects and encodes certain ones of the FTLSM coefficients for transmission to a remote terminal for analysis. The encoded signals include pitch data and vocal tract impulse data, both of which are derived from the FTLSM signals.

The discrete Fourier transform is also used in many vocoder arrangements, one of which is described in the article "Channel Vocoder Based on C. C. D. Discrete-Fourier-Transform Processors" by M. C. Davie appearing in *IEE Proceedings*, Vol. 127, Part F, No. 2, April 1980 at pp. 132-143. The Davie paper discusses the implementation of a central speech processor based on a chargle-coupled-device (c.c.d.) discrete Fourier transform algorithm which is employed to provide spectral data for channel compression and cepstral data for pitch detection.

It is also known in the art to employ Fourier transform techniques to achieve speech compression. One article describing a particular technique is "Speech Compression by Means of the Discrete Fourier Transform" by J. Shulman, appearing in *Proceedings of the Ninth Convention of Electrical and Electronics Engineers in Israel*, Apr. 22-24, 1978 at p. A-2-4. The method as described involves sampling of the speech signal, calculation of the discrete Fourier transform, selection of dominant spectral lines (according to a local maxima algorithm) and transmission of the selected lines. At the receiving end, reconstruction is performed by inverse transforming (IDFT) the received components, with zeroes inserted in place of the missing components.

There exist a limitation in all of the above-cited multiplexing references wherein the bandwidth of the speech signal is inevitably increased by the addition of data thereto, thus rendering communication over limited-bandwidth channels very difficult. A problem remaining in the prior art, therefore, is to provide a means for multiplexing data and speech without incurring an excessive expansion of the speech bandwidth.

SUMMARY OF THE INVENTION

The limitation associated with the prior art has been overcome by the present invention which relates to a means for transmitting data on the phase of speech, and, more particularly, a means for embedding data into speech signals, with only a minimal increase in the signal bandwidth, by performing a discrete Fourier transform (DFT) on blocks of speech samples and replacing the resulting phase components of selected portions of the speech transform with the data which is desired to be transmitted.

It is an aspect of the present invention to provide a means for simultaneously transmitting data and speech over communication channels which is capable of transmitting data with an acceptably low bit error rate while maintaining the quality of the speech at an acceptable level.

Other and further aspects of the present invention will become apparent during the course of the following description and by reference to the accompanying drawings.

BRIEF DESCRIPTION OF THE DRAWINGS

Referring now to the drawings, where like numerals represent like parts in several views.

DETAILED DESCRIPTION

Figure 1:
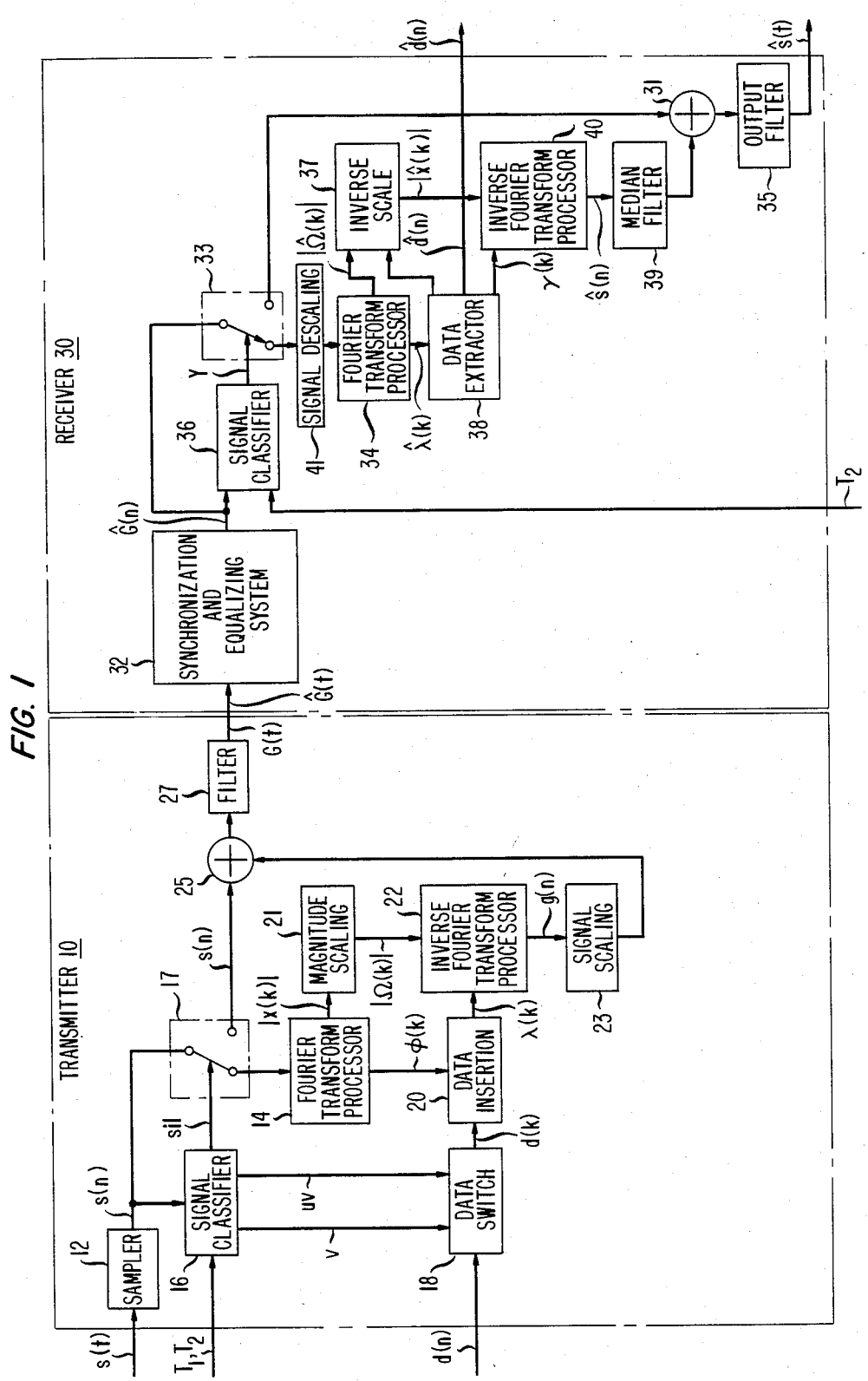
FIG. 1 illustrates a general block diagram of an exemplary communication system capable of transmitting data in place of selected portions of the phase of a speech signal formed in accordance with the present invention.

The present invention, as discussed in greater detail hereinafter, relates to a means for embedding data into speech signals with only a minimal bandwidth expansion of the combined speech and data signal as compared with the original speech signal. In accordance with the present invention, combined transmission of data and speech is achieved by discarding some phase components in the speech signal and replacing them with data. Since the phase portion of unvoiced monaural speech contains little information, relatively little speech signal degradation will occur by replacing the phase components of the speech signal over the message bandwidth with data at the transmitter, and subsequently replacing the recovered data with random phase information at the receiver. In voiced speech, the short-time Fourier speech has a quasi-periodicity, and an energy level that is in general considerably in excess of that encountered with unvoiced speech. Consequently, if data is loaded onto too many phase components of voiced speech at the transmitter, the quasi-periodicity of the recovered voiced speech having random phase components in place of those portions carrying data will be disturbed and speech quality degraded. Thus, when voiced speech is present, a minimal number of phase components will be replaced by data.

For the purposes of the present discussion, the operation of the present invention will be explained as related to a single block of N contiguous speech samples, where it is understood that the present invention functions to operate on successive blocks of N contiguous speech samples. In accordance with the present invention, the block of contiguous N speech samples s(n) is first discrete Fourier transformed (DFT) to yield N Fourier coefficients X(k), where k comprises integer values from zero to N−1. These coefficients have complex conjugate properties about the value N/2, and during the initial phase of the data embedding process the coefficients spanning the range from k equal to $k_{c1}$ to k equal to $k_{c2}$ are considered, where $k_{c1}$ and $k_{c2}$ are coefficient locations corresponding to frequencies which represent the lower and upper frequencies in the input speech signal s(t), respectively. After data has been inserted into the coefficients of X(k) ranging from $k_{c1}$ to $k_{c2}$, those coefficients from N/2 to N−1 are modified accordingly to preserve the complex conjugate relationship prior to performing an inverse discrete Fourier transform (IDFT).

Prior to performing the DFT, a determination is sought to establish whether the current block of N samples can support the transmission of embedded data. The determination is made by performing a crude, i.e., simplified, "voiced"/"unvoiced" decision, for example, by measuring the mean square value of the N speech samples and comparing the mean square value to a predetermined system threshold. Thus, for the purposes of the present discussion, reference to "voiced" speech will imply that its mean square value exceeds some predetermined system threshold, and "unvoiced" speech will imply merely that its mean square value lies between some system thresholds, and should not be interpreted literally as referring to voiced or unvoiced speech. It is to be understood that other types of classification are possible, the principle being that in general the speech having its phase components from $k_{c1}$ to $k_{c2}$ randomized with an acceptable distortion will be deemed "unvoiced" speech, while if only a limited number of phase components can be randomized to maintain acceptable distortion, the speech will be deemed "voiced" speech. If voiced or unvoiced speech is deemed present, J phase components or M phase components of the DFT are discarded, respectively, where J<M, and $M \leq k_{c2} - k_{c1} + 1$. Data is then introduced in place of the discarded phase components where, for example, a logical 0 may be represented by $+\pi/2$ and a logical 1 by $-\pi/2$. For the purposes of the present discussion, data will be assumed to be binary, although multi-level data can be accommodated. The IDFT is then performed on the combined signals, yielding an output signal which comprises virtually the same bandwidth as the original signal since the multiplexing was performed in the frequency domain instead of the time domain.

A block diagram of a transmission system capable of simultaneously transmitting speech and data in accordance with the present invention is illustrated in FIG. 1, where the individual system components are described in greater detail hereinafter in the discussion associated with the remaining figures. In general, a speech signal s(t) and a digital data stream d(n) enter a transmitter 10, as illustrated in FIG. 1, and are therein transformed into a multiplexed signal G(t) produced as the output of transmitter 10.

Transmitter 10 comprises, as shown in FIG. 1, a sampler 12 which samples the analog speech signal at a predetermined rate greater than the Nyquist rate, and produces a sequence s(n) comprising N samples related thereto. Sequence s(n) is subsequently applied as an input to a signal classifier 16. Signal classifier 16 functions to determine whether the current speech sequence s(n) is voiced speech, unvoiced speech, or silence, by a process to be described in greater detail hereinafter in association with the discussion of transmitter 10 in FIG. 2. The output of signal classifier 16 comprises three separate command control signals, where these control signals are depicted in FIG. 1 as "v" for voiced speech, "uv" for unvoiced speech, and "sil" for silence. The voiced and unvoiced command signals "v" and "uv" are subsequently applied as an input to a data switch 18. Data switch 18, as described in greater detail hereinafter, is responsive to the data stream input d(n) to transmitter 10, where data input d(n) is transferred to an output line provided either control signal "v" or "uv" are generated. In particular, when "v" is present, J−ϵ data bits are produced as an output of data switch 18 and when control signal "uv" is present, M−ϵ data bits are produced as an output, where ϵ is a signalling parameter providing information to the receiver as to whether the "v" or "uv" command was present at the transmitter. It will be assumed for the purposes of the present discussion that one bit is embedded into each of the phase components permitted to convey data. However, it is to be understood that channel coding of the data may be employed wherein more than one phase component is assigned to each information bit.

The "sil", or silence, command output from signal classifier 16 is applied as an input to a switch 17. In accordance with the present invention, when silence is deemed present, input sequence s(n) is transmitted unmodified, that is, no data is embedded in the phase portion of the speech signal. Therefore, switch 17 when activated into position A by the presence of an "sil" command output from signal classifier 16 will allow input sequence s(n) to by-pass the data insertion portion of transmitter 10 and be applied directly as an input to a signal adding means 25.

When speech is present, the absence of an "sil" output from signal classifier 16 will activate switch 17 into position B, and, therefore, switch 17 will function to apply input sequence s(n) as an input to a Fourier transform processor 14. Fourier transform processor 14 functions to produce as separate outputs the DFT magnitude components $|X(k)|$ and the DFT phase components $\Phi(k)$ of sequence s(n) according to the following equations:

$$X(k) = \sum_{n=0}^{N-1} s(n)e^{-j\frac{2\pi}{N}nk} ; k = 0,1,\ldots, N-1 \quad (1)$$

where $$|X(k)| = \sqrt{Re^2 s(k) + Im^2 s(k)} ,$$

and $$\phi(k) = \tan^{-1} (Im\ X(k)/Re\ X(k)), \quad (2)$$

where N is the number of speech samples used in the Fourier transform process, and Re X(k) and Im X(k) are the real and imaginary components of X(k), respectively.

The output of data switch 18 is subsequently applied as an input to a data insertion means 20, where the original phase sequence $\Phi(k)$ generated by Fourier transform processor 14 is also applied as an input to data insertion means 20. Depending on whether the "v" or "uv" command is present, J or M phase components of phase sequence $\phi(k)$ are discarded and data is inserted in their place (in the form of, for example, $+\pi/2$ for a logical 0 and $-\pi/2$ for a logical (1). The output of data insertion means 20, therefore, is a data-carrying phase signal $\lambda(k)$, which in the presence of voiced or unvoiced speech comprises data in place of a particular number of phase components.

For reasons discussed in greater detail hereinafter, magnitude components $|X(k)|$ must be scaled by an appropriate method prior to transmission. Therefore, as seen by reference to FIG. 1, magnitude components $|X(k)|$ generated by Fourier transform processor 14 are applied as an input to a magnitude scaling means 21. In accordance with the present invention, the magnitude values of those DFT coefficients supporting data are scaled to form a scaled sequence denoted $|D(k)|$, and the output of magnitude scaling means 21 contains portions of both the original sequence $|X(k)|$ and scaled sequence $|D(k)|$, and is denoted by $|\Omega(k)|$. Both data-carrying phase signal $\lambda(k)$ and magnitude components $|\Omega(k)|$ are subsequently applied as input to an inverse Fourier transform processor 22.

Inverse Fourier transform processor 22 functions as is well-known in the art, and generates as an output a multiplexed sequence g(n). Multiplexed sequence g(n) is subsequently applied as an input to a signal scaling means 23 which functions to adjust the magnitude of signal g(n) (by, for example, adjusting the peak amplitude or average power value so that output signal G(t) comprises approximately the same amplitude as input speech signal s(t)) to produce an output signal G(n) which is subsequently applied as an input to signal adding means 25. The output of signal adding means 25 is subsequently applied as an input to a filtering means 27 which produces as the output of transmitter 10 a multiplexed signal G(t) which is bandlimited to the same frequency band as speech signal s(t). Output signal G(t) therefore comprises information related to speech signal s(t), data stream d(n) and when d(n) is present, information relating to whether the speech was deemed voiced or unvoiced.

As shown in FIG. 1, the signal G(t) produced by transmitter 10 travels through the communication medium and is subsequently processed by a receiver 30 and is converted into both a speech signal ŝ(t), perceptually similar to the original speech signal ŝ(t), and a data stream d̂(n). For the purposes of the present discussion, the symbol "^" above a signal or sequence related to the receiver denotes an association with a like signal or sequence at the transmitter. As shown, received signal Ĝ(t) is first applied as an input to a synchronization and equalizing system 32. System 32 functions to synchronize the received signal with the transmitted signal by any method well-known in the art, and subsequently samples the received signal to produce as an output a received sequence Ĝ(n). It is to be noted that the output of system 32, denoted Ĝ(n), will equal a sampled version of transmitted signal G(t) only under ideal conditions and, in general, signal degradation will occur to signal G(t) as it travels through the communication medium. However, any of the well-known channel equalization techniques may be employed to limit the amount of signal degradation. For the remainder of the present discussion, therefore, it will be assumed that the system employed comprises ideal channels to avoid confusion in presenting the concepts involved in the present invention.

Returning to FIG. 1, the sequence Ĝ(n) produced by system 32 is subsequently applied as an input to a signal classifier 36 which determines by a process defined hereinbelow if data is present in the current block of speech samples. If signal classifier 36 determines that silence is present, a switch 33 is activated into position A and allows sequence Ĝ(n) to by-pass the data extraction circuitry, and is applied directly as an input to an output adder 31. If signal classifier 36 determines that speech, voiced or unvoiced, is present, sequence Ĝ(n) is conveyed via a switch 33 which has been set in position B by signal classifier 36, and is descaled by a signal descaling means 41. Signal descaling means 41 performs the inverse operation of signal scaling means 23 and produces as an output a sequence ĝ(n), where sequence ĝ(n) is subsequently applied as an input to Fourier transform processor 34.

In accordance with the present invention, Fourier transform processor 34 functions to reverse the process performed by inverse Fowrier transform processor 22 of transmitter 10. Therefore, the output signals from Fourier transform processor 34 will be approximately equal to the signals applied as inputs to inverse Fourier transform processor 22, in particular, magnitude components $|\hat{\Omega}(k)|$ and data-carrying phase sequence $\hat{\lambda}(k)$. Data-carrying phase sequence $\hat{\lambda}(k)$ is subsequently applied as an input to a data extractor 38, which after observing $\epsilon$ extracts J or M components from $\hat{\lambda}(k)$ when voiced speech or unvoiced speech is present, respectively. These extracted components of $\hat{\lambda}(k)$, therefore, are the data values transmitted in a $\pm\pi/2$ format. In place of the extracted data values, data extractor 38 inserts random phase components and produces as an output phase components $\gamma(k)$.

Magnitude components $|\hat{\Omega}(k)|$ generated by Fourier transform processor 34 are subsequently applied as inputs to an inverse magnitude scaling means 37 which functions to reverse the scaling procedure performed by magnitude scaling means 21 and, therefore, produces as an output a magnitude sequence $|\hat{X}(k)|$. Magnitude sequence $|\hat{X}(k)|$ is subsequently applied as an input to an inverse Fourier transform processor 40 which is also responsive to phase sequence $\gamma(k)$. The output of inverse Fourier transform processor 40 will be, therefore, an approximation ŝ(n) of the original speech sequence s(n). Samples at the beginning and at the end of successive blocks of sequences ŝ(n) are subsequently subjected to median filtering means 39, which functions to mitigate the effects of end-of-block distortions. The output of median filter 39 is subsequently applied as an input to output adder 31, where the output of adder 31 is applied as an input to filtering means 35 which produces the recovered speech signal ŝ(t). Recovered speech signal ŝ(t), therefore, will be a perceptual approximation to the original speech signal s(t), where any difference results from the insertion of random phase components $\gamma(k)$ in place of the original $\phi(k)$ components that were employed to carry data.

Figure 2:
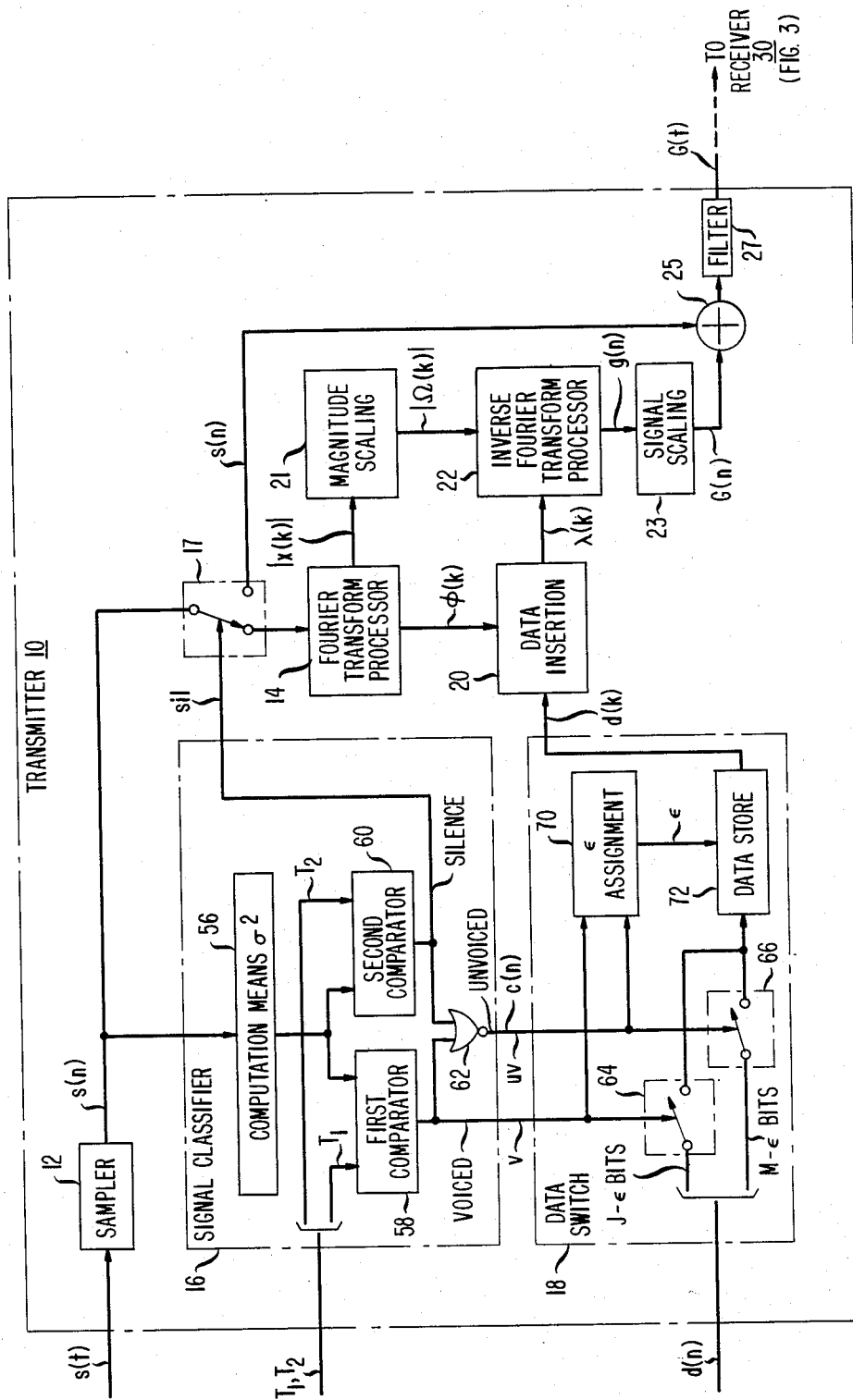
FIG. 2 illustrates in detail an exemplary transmitter arrangement capable of embedding data in the phase of speech in association with the present invention.

A detailed block diagram of an exemplary transmitter 10 is illustrated in FIG. 2. As mentioned hereinbefore, input speech signal s(t) bandlimited to, for example, 200 Hz to 3.2 kHz, is applied as an input to sampler 12 where it is sampled at a rate of $f_s$ Hz, for example, 8 kHz, and assembled into sequential blocks of N contiguous samples where one block of these samples forms speech sequence s(n). As described hereinabove in association with FIG. 1, sequence s(n) is applied as an input to speech classifier 16. An approximate determination of the type of speech present may be made, as is well known in the art, by determining the mean square value $\sigma^2$ of the samples forming sequence s(n), where $\sigma^2$ is defined by the equation $$\sigma^2 = \frac{1}{N} \sum_{n=0}^{N-1} s^2(n). \quad (3)$$

Thus, in accordance with the present invention, upon entering signal classifier 16, sequence s(n) is applied as an input to a computation means 56 which is capable of calculating the mean square value of the samples in accordance with equation (3). A current mean square value $\sigma^2$ is subsequently applied as an input to a first comparator 58 and a second comparator 60, where first comparator 58 is also responsive to a predetermined first threshold $T_1$, and second comparator 60 is responsive to a predetermined second threshold $T_2$ ($T_1 > T_2$). Mean square value $\sigma^2$ of the current block is compared with thresholds $T_1$ and $T_2$, and the decision to transmit J or M bits of data is made according to the following inequalities:

$\sigma^2 < T_2$; silence present, no data transmitted (4)

$T_2 \leq \sigma^2 < T_1$; unvoiced speech present, M data bits transmitted (5)

$T_1 \leq \sigma^2$; voiced speech present, J data bits transmitted. (6)

In accordance with inequalities (6) and (4), respectively, the outputs from first and second comparators 58 and 60 are the "voiced speech" or "v" and "silence" or "sil" output commands of speech classifier 16. The outputs from first and second comparators 58 and 60 are also applied as inputs to a NOR gate 62, where the output of NOR gate 62, in accordance with inequality (5), is the "unvoiced speech" or "uv" output of signal classifier 16.

As shown in detail in FIG. 2, data switch 18 comprises a pair of separate switches 64 and 66. Specifically, the output of first comparator 58 operates a first data switch 64 and the output of NOR gate 62 operates a second data switch 66. Switches 64 and 66 are utilized wherein they remain in an open position for values of logical 0 applied thereto, and in a closed position for values of logical 1 applied thereto. As seen by reference to data switch 18 of FIG. 2, if the output of first comparator 58 is a logical 1, first data switch 64 will be activated and J−ϵ data bits will be passed to the output of data switch 18 in accordance with equation (5). Alternatively, if the output of NOR gate 62 is a logical 1, second data switch 66 will be activated and, as shown in FIG. 2, M−ϵ data bits will be transferred to the output of data switch 18. Lastly, if the outputs of both first comparator 58 and NOR gate 62 are logical 0's (indicating the presence of "silence") neither data line will be connected to the output of data switch 18 and, therefore, no data will be transmitted.

The silence output of signal classifier 16, as described hereinabove, is subsequently applied as a control signal input to switch 17. When silence is present, switch 17 is activated into position A so that input sequence s(n) by-passes the data insertion portion of transmitter 10 and is applied directly as an input to signal adding means 25. When speech is present, switch 17 is activated into position B so that input sequence s(n) is applied as an input to Fourier transform processor 14. Fourier transform processor 14, as described hereinabove in association with FIG. 1, functions to produce as separate outputs a magnitude sequence $|X(k)|$ and a phase sequence $\phi(k)$.

The outputs from first comparator 58 and NOR gate 62 are also applied as inputs to a voiced/unvoiced assignment means 70 contained in data switch 18, which functions to add ϵ bits to the data transmitted to inform the receiver of whether J or M phase components have been assigned to convey data. For this exemplary arrangement ϵ may only comprise a single bit of information where, for example, ϵ=0 indicates that M data bits are being transmitted and ϵ=1 indicates that J data bits are being transmitted. The value of ϵ produced by ϵ assignment means 70 is subsequently applied as an input to a data store 72, where data store 72 is also responsive to the output of J−ϵ or M−ϵ data bits via first or second data switches 64 or 66, respectively. Data store 72 functions to insert the ϵ assignment bit in a predetermined spectral location and subsequently produces as the output of data switch 18 a sequence of M or J bits.

The output of data store 72 is subsequently applied as an input to a data insertion means 20 which is also responsive to the original phase sequence $\phi(k)$ generated by Fourier transformer 14. If unvoiced speech is being transmitted, the M elements of the original phase sequence $\phi(k)$ over the range $k_{c1}$ to $k_{c2}$ are replaced by the data sequence $\theta(k)$ in the form of, for example, $+\pi/2$ for a value of logical 0 and $-\pi/2$ for a value of logical 1 to form data-carrying phase sequence $\lambda(k)$. In the case of voiced speech, J components of $\phi(k)$ over the range $k_{c1}$ to $k_{c2}$ are replaced by $\theta(k)$ to form data-carrying phase sequence $\lambda(k)$.

If inequality (5) is satisfied for the current block of speech samples, the speech is almost certainly unvoiced. When unvoiced speech occurs, the vocal cords do not vibrate and the sounds originate due to turbulent air flow at a constriction in the vocal tract. Unvoiced speech has a noise-like nature and tends to have relatively low energy. The former characteristic is valuable when data, transmitted as the phase components in the unvoiced speech signal, are removed at the receiver and replaced with random phase components. The re-introduced phase components have a similar randomness as the original components, and the perceptual quality of the sound is negligibly degraded. The low energy of unvoiced speech is, by contrast, an undesirable feature when data is embedded in the phase components, as channel noise may precipitate large variations in the phase of the received signal causing a high bit error rate and, therefore, steps should be taken to increase the energy of the unvoiced speech to allow both the unvoiced speech and data to be transmitted accurately.

Therefore, in accordance with the present invention, the effect of channel noise on unvoiced speech is mitigated, as mentioned hereinabove, by scaling the magnitude of the spectral components $|X(k)|$ which are conveying data by using any of the techniques well-known in the art, one such technique being $\mu$-law scaling. $\mu$-law scaling will produce magnitude components in accordance with the equation $$|D(k)| = \frac{V\log\left(1 + \mu_{uv}\frac{X(k)}{V}\right)}{\log(1 + \mu_{uv})} ; X(k) < V \quad (7)$$

$$= V; X(k) \geq V,$$

where $\mu_{uv}$ is defined as the compression factor for unvoiced speech and V is defined as the $\mu$-law overload parameter. The factor $\mu_{uv}$ is selected to provide an acceptably low bit error rate, and also to contain the amplitude of transmitted signal G(t). As shown in FIG. 2, the $\mu$-law scaling is performed by a $\mu$-law scaling means 21 which may comprise any arrangement capable of performing above-defined equation (7), where the input to $\mu$-law scaling means 21 is speech magnitude sequence $|X(k)|$ produced by Fourier transformer 14.

The output, therefore, of $\mu$-law scaling means 21 will be the above-defined scaled magnitude sequence $|\Omega(k)|$, where $|\Omega(k)|$ comprises $|D(k)|$ for data-carrying coefficients and the remaining coefficients of the original sequence $|X(k)|$ that are not carrying data. For voiced speech, the magnitude of the J components conveying data are also subject to $\mu$-law amplitude scaling, according to equation (7), where $\mu_{uv}$ is replaced by the compression factor $\mu_v$ for voiced speech. Both $|\Omega(k)|$ and $\lambda(k)$ are subsequently applied as separate inputs to inverse Fourier transformer 22 which, as described hereinbefore in association with FIG. 1, performs an inverse Fourier transform thereon to produce as an output a sequence g(n) containing both the data and speech sequences. The output of signal scaling means 23 is applied to the input of adder 25. The samples at the output of adder 25 are subsequently filtered by filtering means 27 to produce as the output of transmitter 10 the continuous signal G(t).

Figure 3:
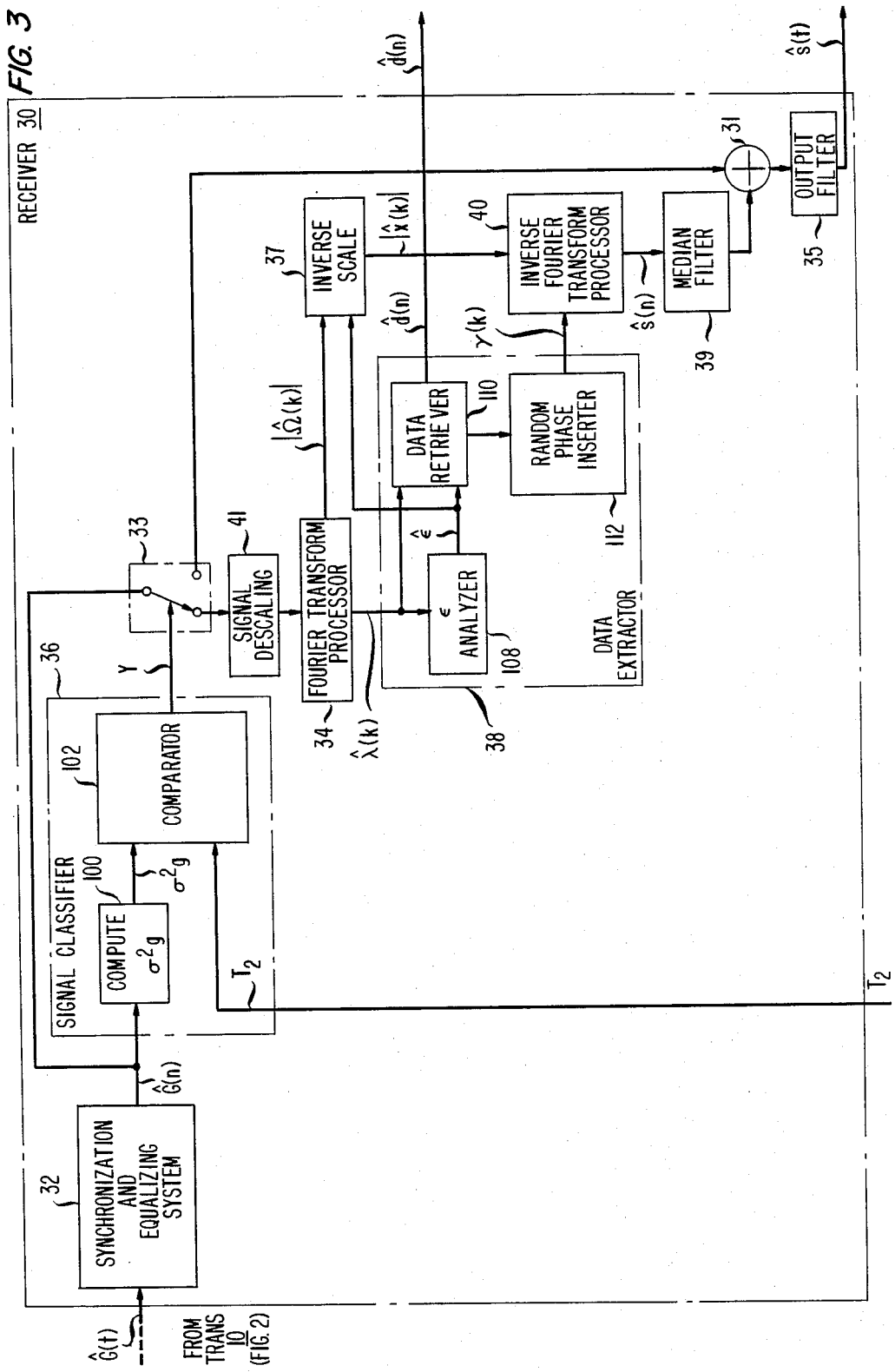
FIG. 3 illustrates in detail an exemplary receiver arrangement capable of extracting the data from the speech signal transmitted by the arrangement illustrated in FIG. 2.

As discussed hereinabove in association with FIG. 1, output signal G(t) produced by transmitter 10 is transmitted through the communication medium and is subsequently processed by receiver 30 to be reconverted into an approximation of the original speech signal ŝ(t) and a close approximation of the data stream d̂(n), where an exemplary receiver arrangement, which is a preferred embodiment formed in accordance with the present invention, is illustrated in detail in FIG. 3. It will be assumed for the purpose of explanation that all signal paths are ideal channels, thereby allowing receiver 30 to recover speech signal ŝ(t) which is perceptually similar to s(t) and data stream d̂(n). It is to be understood, however, that in implementation of the present invention in association with non-ideal channels, signal distortion that may cause data errors may occur where such signal distortion may be appreciably reduced by employing any of the well-known channel equalization techniques, for example, the method discussed in *Principles of Communications*, R. F. Ziemer et at, Houghton Mifflin Co., Boston, Mass., 1976 at pp. 353-356. The above-described $\mu$-law scaling of magnitude components will also reduce the transmission error rate associated with non-ideal channels.

Received signal Ĝ(t), as discussed hereinabove in association with FIG. 1, is first applied as an input to synchronization and equalizing system 32, which operates as described hereinabove in association with FIG. 1, and produces as an output a received sequence Ĝ(n) which comprises N discrete, sampled values of received signal Ĝ(t). As shown in FIG. 3, sequence Ĝ(n) is subsequently applied as an input to signal classifier 36. Signal classifier 36, as shown in FIG. 3, comprises a computation means 100 and a comparator 102. Sequence Ĝ(n) produced by system 32 is applied as an input to computation means 100, which functions to determine the mean square value, $\sigma_g^2$, of the input applied thereto. Computation means 100, like computation means 56 of transmitter 10, may comprise any arrangement capable of solving above-defined equation (3) and subsequently producing as an output a received mean square value $\sigma_g^2$. Received mean square value $\sigma_g^2$ is subsequently applied as a first input to comparator 102, where the second input to comparator 102 is threshold value T₂ defined hereinabove in association with equation (4) scaled by a constant L, where L is a system parameter in excess of unity and is employed to ensure that the effects of channel noise on the transmission of silence will not cause comparator 102 to make an incorrect determination of the presence of speech.

As described hereinabove in associaton with the detailed description of transmitter 10, if data is embedded in the speech signal, spectral scaling of magnitude sequence $|X(k)|$ will have been performed at transmitter 10 to form scaled sequence $|D(k)|$. In association with the scaling function, therefore, the mean square value of the combined signal will be significantly greater than threshold value T₂. The output of comparator 102, therefore, is a control signal Y which will comprise a first value when silence is present ($\sigma_g^2 < LT_2$) and a second value when speech is present ($\sigma_g^2 \geq LT_2$). Control signal Y is subsequently applied as an input to switch 33. If silence is present, control signal Y activates switch 33 into position A and allows received sequence Ĝ(n) to bypass the remainder of the data extraction circuitry of receiver 30, and is subsequently applied as an input to signal adder 31.

If speech is present, control signal Y activates switch 33 into position B so that received sequence Ĝ(n) is applied as an input to a signal descaling means 41. Signal descaling means 41 performs the inverse procedure of signal scaling means 23 of transmitter 10, and the output therefrom, ĝ(n), is applied as an input to Fourier transform processor 34. Fourier transformer 34 functions to reverse the processing performed by inverse Fourier transformer 22 of transmitter 10 and, therefore, produces as separate outputs a received magnitude sequence $|\hat{\Omega}(k)|$ and a received phase sequence $\hat{\lambda}(k)$, where both sequences are approximations of the inputs applied to inverse Fourier transformer 22. Phase sequence $\hat{\lambda}(k)$ is subsequently applied as an input to data extractor 38. As seen by reference to FIG. 3, data extractor 38 comprises an $\epsilon$ analyzer 108, a data retriever 110 and a random phase inserter means 112. Received data-carrying phase sequence $\hat{\lambda}(k)$ is applied as an input to $\epsilon$ analyzer 108 which functions to examine the $\epsilon$ bit(s) of phase sequence $\hat{\lambda}(k)$ to determine if voiced or unvoiced speech is present.

As discussed hereinabove in association with FIG. 2, $\epsilon$ will comprise a first value when voiced speech is present and a second value when unvoiced speech is present. The output $\hat{\epsilon}$ signal from $\epsilon$ analyzer 108 is subsequently applied as a first input to data retriever 110. Received phase sequence $\hat{\lambda}(k)$ is applied as a second input to data retriever 110 where, in accordance with the value of $\hat{\epsilon}$, either J phase components or M phase components are examined and the data extracted. Data retriever 110 also functions to generate the data bits into a binary data format in accordance with, for example, $$0 \leq \hat{\theta}(k) < \pi, \text{ logical 0 present}$$

$$-\pi \leq \hat{\theta}(k) < 0, \text{ logical 1 present.} \quad (8)$$

Therefore, the recovered data is produced as an output data sequence $\hat{d}(n)$ of transmitter 30.

Data retriever 110 produces as a second output instructions to random phase inserter 112 specifying which phase components need to be randomized, and those phase components $\hat{\phi}(k)$ which were not used to the conveyance of data. Random phase insertion means 112 functions to replace missing phase components by phase components having any value between $\pm \pi$ with equal probability, and produce as an output a phase sequence $\hat{\gamma}(k)$.

As discussed hereinabove in association with FIG. 2, the magnitude components of speech are subjected to scaling, for example, $\mu$-law scaling, prior to transmission in order to improve the performance of the system. Therefore, an inverse scaling procedure must be applied to accurately recover the original speech signal. Therefore, the $|\hat{D}(k)|$ components of magnitude sequence $|\hat{\Omega}(k)|$ are applied as an input to an inverse $\mu$-law scaling means 37. Inverse $\mu$-law scaling means 37 is configured to perform the inverse operation of $\mu$-law scaling means 21 of transmitter 10 and will, therefore, produce as an output an approximation to the original magnitude sequence $|\hat{X}(k)|$.

In order to recover the transmitted speech signal, magnitude sequence $|\hat{X}(k)|$ and phase sequence $\hat{\gamma}(k)$ are subsequently applied as separate inputs to inverse Fourier transformer 40. The output of inverse Fourier transformer 40, therefore, will be a recovered speech sequence $\hat{s}(n)$. Median filtering means 39 mitigates the effects of end block distortion in $\hat{s}(n)$, and the output of median filtering means 39 is subsequently applied as an input to adder 31. The output of adder 31 is filtered by filtering means 35 to yield a recovered speech signal occupying approximately frequency band as that of the original speech signal $s(t)$, and is perceptually similar to $s(t)$.

What is claimed is:

1. In a simultaneous transmission system for data and analog speech:

a transmitter responsive to both an analog speech signal (s(t)) and a data stream (d(n)) for simultaneously transmitting the analog speech signal and the data stream as a combined message signal (G(t)) wherein the transmitter comprises combination means responsive to both said analog speech signal and said data stream for transforming said analog speech signal from a time domain representation into a frequency domain representation, inserting a predetermined portion of said data stream in an appropriate form in place of a selected portion of the frequency domain representation, and transforming said frequency domain representation into a time domain representation of the combined message signal output of the transmitter; and a receiver responsive to the combined message signal produced by said transmitter and recovering therefrom both said analog speech signal and said data stream wherein the receiver comprises separation means responsive to said combined message signal for transforming said combined message signal from a time domain representation into a frequency domain representation, removing and producing as a data output the predetermined portion of said data stream therefrom, inserting a plurality of random components in place of the removed portion of said frequency domain representation, and transforming said frequency domain into a time domain representation of a recovered analog speech signal.

2. A transmission system formed in accordance with claim 1 wherein the combination means comprises sampling means responsive to the analog speech signal for continuously producing blocks of N speech samples as a speech sequence (s(n)) related thereto;

Fourier transform means responsive to the speech sequence produced by the sampling means for performing a Fourier transform thereon and producing as separate outputs a magnitude sequence ($|X(k)|$) and a phase sequence ($\phi(k)$) related to said speech sequence;

magnitude scaling means responsive to the magnitude sequence produced by the Fourier transform means for producing a scaled magnitude sequence ($|\Omega(k)|$) related thereto;

signal classifying means responsive to said speech sequence for determining if said speech sequence represents an approximation to silence, voiced speech, or unvoiced speech and discarding a first plurality (J) of phase components of the phase sequence associated with voiced speech and a second plurality (M) of phase components of said phase sequence associated with unvoiced speech;

data insertion means responsive to both the signal classifying means and the data stream for inserting a predetermined portion of said data stream in an appropriate form in place of the discarded phase components of said phase sequence to produce as an output a data-carrying phase sequence ($\lambda(k)$);

inverse Fourier transform means responsive to both the scaled magnitude sequence produced by the magnitude scaling means and the data-carrying phase sequence produced by the data insertion means for performing an inverse Fourier transform thereon and producing as an output a combined message sequence (g(n)); and signal scaling means responsive to the combined message sequence produced by the inverse Fourier transform means for filtering and scaling said combined message sequence and producing as an output of the transmitter a combined message signal (G(t)).

3. A transmission system formed in accordance with claim 2 wherein the signal scaling means comprises
   computation means responsive to the speech sequence produced by the sampling means for generating and producing as an output a mean square value ($\sigma^2$) related thereto;
   a first comparator responsive to both the mean square value output of the computation means and a first predetermined threshold value ($T_1$) for producing as an output a voiced control signal which comprises a first value (0) when said mean square value is less than the first predetermined threshold value and a second value (1) when said mean square value is at least equal to said first predetermined threshold value;
   a second comparator responsive to both said mean square value and a second predetermined threshold ($T_2$), wherein said first predetermined threshold is less than the second predetermined threshold, for producing as an output a silence control signal which comprises a first value (0) when said mean square value is at least equal to said second predetermined threshold value and a second value (1) when said mean square valve is less than said second predetermined threshold value;
   gating means responsive to both the voiced control signal output of said first comparator and the silence control signal output of said second comparator for producing as an output an unvoiced control signal which comprises a first value (0) when either one of both said voiced control signal and said silence control signal comprise their associated second value, and comprises a second value (1) when both said voiced control signal and said silence control signal comprise their associated first value.

4. A transmission system formed in accordance with claim 1 wherein
   the separation means comprises
   synchronization and equalizing means responsive to the combined message signal for continuously producing blocks of N samples as a combined and scaled message sequence ($\hat{G}(n)$) related thereto;
   signal descaling means responsive to the combined and scaled message sequence produced by the synchronization and equalizing means for performing an inverse scaling procedure thereon and producing as an output a combined message sequence ($\hat{g}(n)$) related thereto;
   Fourier transform means responsive to the combined message sequence produced by the signal descaling means for performing a Fourier transform thereon and producing as separate outputs a scaled magnitude sequence ($|\hat{\Omega}(k)|$) and a data-carrying phase sequence ($\hat{\lambda}(k)$) related to said combined message sequence;
   inverse magnitude scaling means responsive to the scaled magnitude sequence produced by the separation means Fourier transform means for performing an inverse scaling operation thereon and producing as an output a magnitude sequence ($|\hat{X}(k)|$);
   signal classifying means (36) responsive to said combined message sequence for determining whether said combined message sequence is speech or silence and producing as an output a first control signal when speech is present and a second control signal when silence is present;
   data extractor responsive to the data-carrying phase sequence produced by the Fourier transform means for extracting a first plurality (J) of phase components from said phase sequence when "voiced" speech is present and extracting a second plurality (M) of phase components from said phase sequence when "unvoiced" speech is present and producing as a first output the extracted phase components decoded into the recovered data stream output of said receiver, said data extractor also capable of randomizing the extracted phase components and producing as a second output an output phase sequence ($\gamma(k)$);
   inverse Fourier transform means responsive to both the magnitude sequence output of said magnitude inverse scaling means and the phase sequence output of said data extractor for performing an inverse Fourier transform thereon and producing as an output a recovered speech sequence ($\hat{s}(n)$); and
   median filtering means responsive to the recovered speech sequence produced by the separation means inverse Fourier transform means for filtering said sequence and producing as an output of said receiver a recovered speech signal ($\hat{s}(t)$).

5. A transmission system formed in accordance with claim 4 wherein the separation means signal classifying means comprises
   computation means responsive to the combined message sequence produced by the sampling means for generating and producing as an output a mean square value ($\sigma_g^2$) related thereto;
   a comparator responsive to both the mean square value produced by the computation means and a predetermined threshold value ($T_2$) for producing a silence output control signal when said mean square value is less than the predetermined threshold value and producing a speech output control signal when said mean square value is at least equal to said predetermined threshold value; and
   the data extractor comprises
   analyzing means responsive to the phase sequence produced by the Fourier transform means for determing if said phase sequence is related to "voiced" speech or "unvoiced" speech and producing a first output signal when "voiced" speech is present and producing a second output signal when "unvoiced" speech is present;
   data retrieving means responsive to both said phase sequence produced by said Fourier transform means and the output signal from the analyzing means for removing a first plurality (J) of phase components from said phase sequence when said first output signal from said control means is present and removing a second plurality (M) of phase components from said phase sequence when said second output signal from said control means is present, the removed phase components thereby produced in data form as the data stream output of the receiver; and
   random phase insertion means (112) responsive to the phase sequence output of said data retrieving means for randomizing the data-carrying phase sequence and producing as an output of said data extraction means the output phase sequence ($\gamma(k)$).

6. A transmitter responsive to both an analog speech signal (s(t)) and a data stream (d(n)) for simultaneously transmitting the analog speech signal and the data stream as a combined message signal (g(t)) wherein the transmitter comprises combination means (14, 16, 17, 18) responsive to both said analog speech signal and said data stream for transforming said analog speech signal from a time domain representation into a frequency domain representation;

insertion means (20) for inserting a predetermined portion of said data stream in an appropriate form in place of a selected portion of the frequency domain representation; and transformation means (22, 28) for transforming said frequency domain representation into a time domain representation of the combined message signal output of the transmitter.

7. A transmitter formed in accordance with claim 6 wherein the combination means comprises sampling means responsive to the analog speech signal for continuously producing blocks of N speech samples as a speech sequence (s(n)) related thereto;

Fourier transform means responsive to the speech sequence produced by the sampling means for performing a Fourier transform thereon and producing as separate outputs a magnitude sequence ($|X(k)|$) and a phase sequence ($\phi(k)$) related to said speech sequence;

magnitude scaling means responsive to the magnitude sequence produced by the Fourier transform means for producing a scaled magnitude sequence ($|\Omega(k)|$) related thereto;

signal classifying means responsive to said speech sequence for determining of said speech sequence represents silence, "voiced" speech, or "unvoiced" speech and discarding a first plurality (J) of phase components of the phase sequence associated with "voiced" speech and a second plurality (M) of phase components of said phase sequence associated with "unvoiced" speech;

the insertion means comprises data insertion means responsive to both the signal classifying means and the data stream for inserting a predetermined portion of said data stream in an appropriate form in place of the discarded phase components of said phase sequence to produce as an output a data-carrying phase sequence ($\lambda(k)$); and the transformation means comprises inverse Fourier transform means responsive to both the scaled magnitude sequence produced by the signal scaling means and the data-carrying phase sequence produced by the data insertion means for performing an inverse Fourier transform thereon and producing as an output a combined message sequence (g(n)); and signal scaling means responsive to the combined message sequence produced by the inverse Fourier transform means for filtering and scaling said combined message sequence and producing as an output of the transmitter a combined message signal (G(t)).

8. A transmitter formed in accordance with claim 7 wherein the signal classifying means comprises computation means responsive to the speech sequence produced by the sampling means for generating and producing as an output a mean square value ($\sigma^2$) related thereto;

a first comparator responsive to both the mean square value output of the computation means and a first predetermined threshold value ($T_1$) for producing as an output a voiced control signal which comprises a first value (0) when said mean square value is less than the first predetermined threshold value and a second value (1) when said mean square value is at least equal to said first predetermined threshold value;

a second comparator responsive to both said mean square value and a second predetermined threshold ($T_2$) wherein the second predetermined threshold is less than said first predetermined threshold for producing as an output a silence control signal which comprises a first value (0) when said mean square value is at least equal to said second predetermined threshold value and a second value (1) when said mean square value is less than said second predetermined threshold value;

gating means responsive to both the voiced control signal output of said first comparator and the silence control signal output of said second comparator for producing as an output an unvoiced control signal which comprises a first value (0) when either one of both said voiced control signal and said silence control signal comprise their associated second value, and comprises a second value (1) when both said voiced control signal and said silence control signal comprise their associated first value.

9. A receiver capable of recovering both an analog speech signal ($\hat{s}(t)$) and a binary data stream (d(n)) from a combined message signal ($\hat{g}(t)$) representative of a combination of the analog speech signal and the binary data stream wherein the receiver comprises separation means responsive to said combined message signal for transforming said combined message from a time domain representation into a frequency domain representation, removing and producing as a data output the predetermined portion of said data stream therefrom;

insertion means (112) for inserting a plurality of random components in place of the removed portion of said frequency domain representation; and transformation means (40) for transforming said frequency domain representation into a time domain representation of a recovered analog speech signal.

10. A receiver formed in accordance with claim 9 wherein the separation means comprises synchronizing and equalizing means responsive to the combined message signal for continuously producing blocks of N samples as a combined and scaled message sequence ($\hat{G}(n)$) related thereto;

signal descaling means responsive to the combined and scaled message sequence produced by the synchronizing and equalizing means for performing an inverse scaling procedure thereon and producing as an output a combined message sequence ($\hat{g}(n)$) related thereto;

Fourier transform means responsive to the combined message sequence produced by the signal descaling means for performing a Fourier transform thereon and producing as separate outputs a magnitude sequence $|\hat{X}(k)|$ and a data-carrying phase sequence ($\hat{\lambda}(k)$) related to said combined message sequence;

inverse magnitude scaling means responsive to the scaled magnitude sequence produced by the separation means Fourier transform means for performing an inverse scaling operation thereon and producing as an output a magnitude sequence ($|\hat{X}(k)|$);

signal classifying means (36) responsive to said combined message sequence for determining whether said combined message sequence represents speech or silence and producing as an output a first control signal when speech is present and a second control signal when silence is present;

data extractor responsive to the data-carrying phase sequence produced by the Fourier transform means for extracting a first plurality (J) of phase components from said phase sequence when voiced speech is present and extracting a second plurality (M) of phase components from said phase sequence when unvoiced speech is present and producing as a first output the extracted phase components in a data form as the recovered data stream output of said receiver, said data extractor also capable of randomizing the extracted phase components and producing as a second output an output phase sequence ($\gamma(k)$);

the transformation means comprises inverse Fourier transform means responsive to both the magnitude sequence output of said inverse magnitude scaling means and the phase sequence output of said data extractor for performing an inverse Fourier transform thereon and producing as an output a recovered speech sequence ($\hat{s}(n)$); and median filtering means responsive to the recovered speech sequence produced by the separation means inverse Fourier transform means for filtering said sequence and producing as an output of said receiver a recovered speech signal ($\hat{s}(t)$).

11. A receiver formed in accordance with claim 10 wherein the separation means signal classifying means comprises computation means responsive to the combined message sequence produced by the sampling means for generating and producing as an output a mean square value ($\sigma_g^2$) related thereto;

a comparator responsive to both the mean square value produced by the computation means and a predetermined threshold value ($T_2$) for producing a silence output control signal when said mean square value is less than the predetermined threshold value and producing a speech output control signal when said mean square value is at least equal to said predetermined threshold value; and the data extractor further comprises analyzing means responsive to the phase sequence produced by the Fourier transform means for determining if said phase sequence is related to "voiced" speech or "unvoiced" speech and producing a first output signal when "voiced" speech is present and producing a second output signal when "unvoiced" speech is present;

data retrieving means responsive to both said phase sequence produced by said Fourier transform means and the output signal from the analyzing means for removing a first plurality (J) of phase components from said phase sequence when said first output signal from said control means is present and removing a second plurality (M) of phase components from said phase sequence when said second output signal from said control means is present, the removed phase components thereby produced in data form as the data stream output of the receiver; and random phase insertion means responsive to the phase sequence output of said data retrieving means for randomizing the data-carrying phase sequence and producing as an output of said data extraction means the output phase sequence ($\gamma(k)$).

* * * * *